United States Patent

Hills

[15] 3,635,304

[45] Jan. 18, 1972

[54] RESETTABLE LOAD LIMITING SAFETY DECOUPLERS FOR A REMOTELY CONTROLLED TOY AUTOMOTIVE VEHICLE STEERING MECHANISM

[72] Inventor: Isaac Hills, c/o My-Toy Company Inc., 944 Third Ave., Brooklyn, N.Y. 11209

[22] Filed: Nov. 23, 1970

[21] Appl. No.: 91,678

[52] U.S. Cl. ................................180/79, 46/221, 74/96, 74/102, 180/2, 280/269
[51] Int. Cl. ..........................................................B62d 7/00
[58] Field of Search ...................180/2, 79, 79.1; 280/89, 90, 280/94, 95, 269; 74/96, 102; 104/244.1; 46/202, 221, 222, 244

[56] References Cited

UNITED STATES PATENTS

| | | | |
|---|---|---|---|
| 734,202 | 7/1903 | Tromble | 280/94 |
| 2,742,735 | 4/1956 | Sommerhoff | 46/244 |
| 3,049,187 | 8/1962 | Medley et al. | 180/79.2 |
| 3,109,668 | 11/1963 | Sampietro | 280/89 |
| 3,314,189 | 4/1967 | Carroll | 46/244 |

Primary Examiner—Leo Friaglia
Assistant Examiner—Leslie J. Paperner
Attorney—Kirschstein, Kirschstein, Ottinger & Frank

[57] ABSTRACT

A remotely controlled locally powered steering mechanism for a toy automotive vehicle utilizing a servomotor for actuating the steering train, wherein there is interposed in the train between the servomotor and the steerable wheels a resettable decouplable device for limiting the force transmitted from the servomotor, said mechanism comprising the resilient arms of a yoke having facing ribs on the interior of the yoke arms extending along the length of the vehicle and jointly engaging opposed portions of a neck in a transversely disposed tie rod, the ends of which are connected to steering knuckles that oscillate steering arms. The yoke arms are adjustably spring biased toward one another to enable the connection between the yoke and tie rod to be selectively adjusted in a fashion such that when the axial impact exerted on the tie rod due to a steerable wheel striking a heavy or stationary object exceeds the maximum force exertable by the servomotor, the arms of the yoke spread and ride off the neck and onto the tie rod whereby the servomotor is not damaged. A restoring spring automatically returns the ribs to their neck-engaging position when the impact force on the tie rod is diminished to less than the maximum force exertable by the servomotor to thereby reestablish a preset coordination between the servomotor and the steerable wheels. Because the yoke arms and ribs run longitudinally of the vehicle chassis, the ribs accommodate movement of the tie rod in a front-to-back direction as the servomotor is actuated without affecting the coordinated control of the steerable wheels. Each steering knuckle includes a ball engaged by an oppositely disposed pair of seats that are biased toward one another with a force greater than the maximum force exerted by the servomotor; moreover axial movement of the tie rod is limited so that in the case of a severe wheel turning shock a ball steering knuckle will decouple after the tie rod has reached the extreme of its travel and thus prevent damage to the kinematic steering train, or to a kingpin, kingpin bracket, steering arm or steering wheel.

24 Claims, 6 Drawing Figures

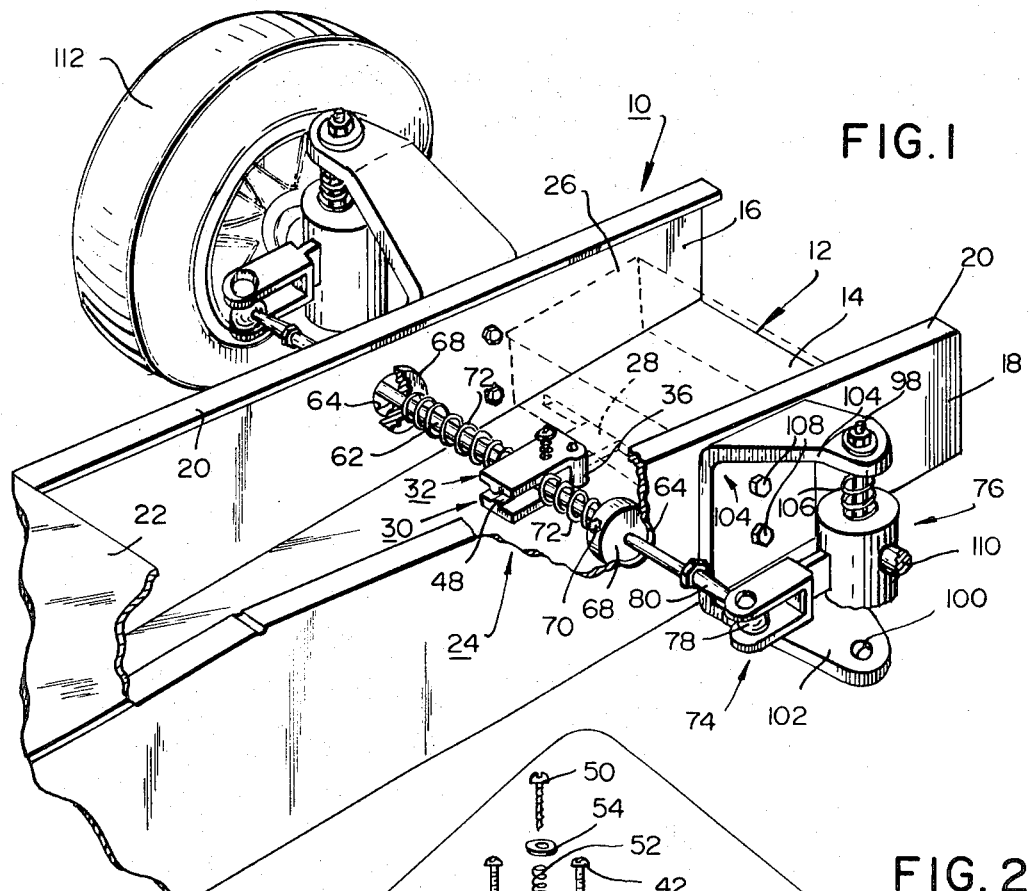

RESETTABLE LOAD LIMITING SAFETY DECOUPLERS FOR A REMOTELY CONTROLLED TOY AUTOMOTIVE VEHICLE STEERING MECHANISM

BACKGROUND OF THE INVENTION

1. Field of the Invention

A toy power vehicle the steering of which is remotely controlled and which includes a resettable load-limiting safety kinematic decoupler between a steering linear servomotor and steerable wheels.

2. Description of the Prior Art

Just as the field of model airplanes has progressed from hand-launched airplanes through rubberband-powered propellers and miniaturized fuel-engine driven propellers to the present day highly sophisticated multichannel radio-controlled airplanes in which many functions of the airplane are controlled by an operator on the ground who manipulates various kinds and numbers of airplane-carried movable elements to obtain desired control of such multiple functions on a distant airplane as motor speed, aileron manipulation, flap manipulation, rudder manipulation, elevator manipulation and brake manipulation, so too has the art of toy automotive vehicles progressed from small string-towed vehicles and child-pushed vehicles through inertial-driven vehicles, spring-motor-driven vehicles, battery-motor-driven vehicles and compressed-gas-driven vehicles to its present highly sophisticated state of multichannel controlled automotive wheeled vehicles in which many functions of the vehicles are controlled by a remote operator through the use of a transmitter and servomotors on the vehicle. These controls include steering, motor fuel flow, clutching and braking, inter alia.

In general, as the controls become more and more complex, so have the automotive vehicles, and with the increasing degrees of sophistication and complexity and with more lifelike simulations of full-sized vehicles, toy automobiles have become heavier and higher powered. Hence, when such a vehicle meets with an accident, considerable mechanical damage ensues. Moreover, a certain coordination must be maintained between the transmitter and the servomotor. When the vehicle meets with an accident, if it is not totally destroyed or heavily damaged, at a minimum the coordination that should be maintained for accurate control of the vehicle is lost.

One of the particular difficulties encountered with toy-wheeled automotive vehicles of the character under consideration, to wit, those in which a radio or other remote link is used to control the vehicle, is that if a vehicle's steerable wheel glances off a heavy or immovable object or strikes such an object at almost any angle, a blow ensues which is transmitted through the steering arm, the steering knuckle and the tie rod to the steering linear servomotor. Since the toy wheel vehicle is quite heavy and since the vehicle may be travelling quite rapidly, the blow, even though only seemingly a small one, transmits a force back to the steering servomotor of a magnitude that frequently is in excess of the load capability thereof. A blow of such magnitude, to wit, in excess of the load capability of the linear servomotor, might easily damage the sensitive and quite expensive servomotor, and, if by chance it should merely shift the output element of the servomotor without damaging the motor, it still would result in a loss of coordination between the servomotor and the steering wheels.

Another difficulty encountered occurs when the blow caused by a steering wheel striking an object is sufficiently great to damage the steering mechanism including, for instance, the tie rod, the ball steering knuckles, the kingpins, the steering arms and the steering wheels themselves. Heretofore, such damage would occur when the blow caused the rod to shift to a limit position and with a rod blocked in that position still left sufficient force to damage a part of the steering kinematic train or a steering arm or wheel.

To date, so far as the inventor is aware, neither of these disadvantages have been overcome, to wit, (1) damage to the steering linear servomotor or loss of synchronism due to a blow of low or high magnitude on a steering wheel, or (2) damage to the steering kinematic train, a steering arm or a steering wheel due to a blow of high magnitude impinging on a steering wheel whose turning movement is blocked by a limit on movement of the tie rod.

SUMMARY OF THE INVENTION

1. Purpose of the Present Invention

It is an object of this invention to provide in a toy steering mechanism an improved structure for avoiding the foregoing drawbacks.

More specifically, it is another object of the invention to provide in a toy vehicle steering mechanism a load-limiting decoupler which will open the kinematic train between a steering linear servomotor and steerable wheels at a load value less than the load capability of the servomotor.

It is still another object of the invention to provide in a toy vehicle steering mechanism a load-limiting decoupler which will open the kinematic train between a steering linear servomotor and steerable wheels at an adjustable load value less than the load capability of the servomotor.

It is still another object of the invention to provide in a toy vehicle steering mechanism a load-limiting decoupler which will open the kinematic train between a steering linear servomotor and steerable wheels, which decoupler can be set to be opened at a value below the load capability of the steering servomotor.

It is a further object of the invention to provide in a toy vehicle steering mechanism a load decoupler which will open the kinematic train between a steering servomotor and steerable wheels.

It is yet a further object of the invention to provide in a toy vehicle steering mechanism a load decoupler which will open the kinematic train between a steering servomotor and steerable wheels at a load value in excess of the load capability of the steering servomotor.

It is yet a further object of the invention to provide different load decouplers one of which will open the kinematic train between a steering servomotor and steerable wheels at a load below and two others which will open the kinematic train between a steering servomotor and each steerable wheel at a load above the maximum load capability of the steering servomotor.

It is another object of the invention to provide in a toy vehicle steering mechanism a load decoupler which does not permanently affect the coordination between the steering servomotor and the steerable wheels.

It is a still further object of the invention to provide in a toy vehicle steering mechanism a load decoupler constituting a pair of spreadable members biased towards one another and drivingly engaging a third member from which they become drivingly disengaged upon overload although remaining in physical engagement with the third member when the load capability of the decoupler is exceeded.

It is yet a further object of the invention to provide in a toy vehicle steering mechanism a load decoupler comprising a ball joint, the ball of which is engaged between a pair of seats that are spring biased towards one another and which spread apart to lose their grip on the ball when the load capability of the decoupler is exceeded.

It is still a further object of the invention to provide in a toy vehicle steering mechanism load decouplers which constitute relatively few and simple parts, are easy and inexpensive to construct and assemble and, withal, are sturdy and effective in operation.

Other objects of the invention in part will be apparent and in part will be pointed out hereinafter.

The invention accordingly consists in the features of construction, combination of elements and arrangement of parts which will be exemplified in the device hereinafter described and of which the scope of application will be indicated in the appended claims.

2. Brief Description of the Invention

A steering servomotor having an output member which experiences movement under control of a radio receiver aboard a wheeled vehicle and connected by a radio link to a remote radio transmitter (a servo transmitter). The components of the system from the radio transmitter to the servomotor are old in the art. The output element of the servomotor linearly drives a yoke having a pair of opposed resilient arms the inner faces of which carry opposed ribs running the lengths of the arms and extending parallel to the length of the chassis of the wheeled vehicle. The ribs define a longitudinal gap. When the servomotor is actuated, the yoke, the arms, the ribs and the gap move in a direction transverse (side to side) of the chassis of the wheeled vehicle. A screw and spring constitute means to urge the two arms towards one another under a selectively controlled pressure. Turning of the screw in one direction compresses the spring and forces the arms closer together, lessening the gap, and increasing the pressure required to spread the arms apart against the force of the spring.

The arms and ribs embrace a laterally extending tie rod necked between its ends. The ribs engage the tie rod at its neck; that is to say, the ribs extend into the neck on opposite sides of the tie rod. Hence, as the servomotor moves its output element right to left or vice versa, the ribs move in the same direction and shift the tie rod in the same direction.

If, for reasons soon to be pointed out, the tie rod attempts to move the ribs and thus the output element of the servomotor, this movement must be accomplished by virtue of the engagement between the sides of the neck and the ribs. The ribs are tapered in cross section as are the sides of the neck, the tapers, the degree of compression of the spring and the resilience of the ribs being such that a certain value of the force tending to shift the tie rod with respect to the servomotor when the latter is stationary, will cam the ribs apart before the servomotor is driven by the tie rod, thereby the positive driving (kinematic) engagement which previously existed between the ribs and neck is rendered kinematically ineffective because of an uncoupling between the servomotor and the tie rod. The "driveback" force required to bring about this uncoupling is set to below the maximum load capability of the servomotor by adjusting the spring force biasing the arms of the yoke towards one another.

The tie rods extend through side plates, such as the sideplates on the frame of the chassis of the toy-powered wheeled vehicle, and said tie rod carries stop collars anchored thereto on opposite sides of the yoke but spaced therefrom. These stop collars act as abutments, in conjunction with the sideplates to limit movement of the tie rod in both lateral directions. On opposite sides of the yoke arms, between the said arms and the collars and encircling the tie rod are compression springs which together function as restoring means to urge the yoke to the position in which the ribs engage the neck. These springs individually exert a force on the yoke (in rib/neck engaging positions) which is less than the maximum load capability of the steering servomotor so that if the force exerted on a tie rod from a source other than the servomotor, e.g., engendered by a blow on a steering wheel and herein referred to as a "drive-back" force, exceeds the load capability of the servomotor, one or the other of the centering springs will yield when the yoke and ribs spread apart. Thus, the restoring springs do not exert a force sufficient to stop the yoke from becoming disengaged from the neck. However, after the yoke has decoupled the springs will restore the yoke to its kinematically effective condition with the rib engaging the neck when the decoupling force has dissipated. The restoration of the yoke to its neck engaging position reestablishes coordination between the ground transmitter and the tie rod.

The ends of the tie rod which extend beyond the sideplates of the vehicle chassis are connected through ball-steering knuckles to steering arms on opposite sides of the vehicle. The ball-steering knuckles employed are of a special construction to each provide a second decoupling means. This second decoupling means requires a force greater than the maximum load capability of the servomotor to disengage the same. Thereby, a "drive-back" force exerted on the tie rod greater than the force required to disengage the first decoupling means (under the maximum load capability of the servomotor) will cause the rib/neck coupling means to become kinematically ineffective. When this first low-level decoupling means opens up, the tie rod is shifted to one extreme of its movement as determined by abutment of a collar with a sideplate. Thereafter, if the "drive-back" force exerted on the steering linkage still is high enough to cause damage, the second decoupling means constituting the ball-steering knuckles becomes effective to break the connection between the tie rod and a steering arm.

The specific construction of the ball-steering knuckles to achieve such operation of the second decoupling means constitutes a ball which is gripped resiliently by a pair of seats with a force in excess of the force required to uncouple the low-level decoupling means, i.e., a force in excess of the maximum load capability of the linear steering servomotor. Either the ball or the gripping seats is carried by an end of the tie rod and the other, i.e., the gripping seats or the ball, is carried by the steering arms. Also carried by the steering arm is a steering axle on which a steerable wheel is rotatable.

It will now be seen that if the operator when manipulating the wheeled model vehicle inadvertently permits a steering wheel to strike either a glancing or an almost head on blow against a heavy or immovable object any fleeting force transmitted back from the steering wheel through the kinematic steering linkage to the linear steering servomotor will, if it could damage the servomotor, be halted at the low-level decoupler constituting the neck and ribs and, if the force is sufficiently great, be stopped at a high-level decoupler constituting one or the other of the special ball-steering knuckles. The second decoupler (actually there are two of them, one associated with each of the two steering wheels) is not self-restoring to kinematically effective (force-transmitting) condition but rather allows the associated wheel to swing freely away from the object causing the impact force and thereby tends to minimize any damage to the steering knuckle, steering arm kingpin, kingpin bracket and steering wheel so that the operator after an accident sufficiently great to uncouple the ball-steering knuckle is less likely to be confronted with an extensive and expensive repair.

The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which is shown one of the various possible embodiments of the invention:

FIG. 1 is a perspective, broken-away, view of the front end of a toy, i.e., model, powered remotely controlled wheeled vehicle such as a racing automobile, the body being removed, the right-hand sideplate and the right-hand steering arms being partially broken away and the right-hand wheel being removed to better show the steering assembly;

FIG. 2 is an exploded perspective view illustrating the low-level decoupler (the rib and necked tie rod) and a high-level decoupler (the right-hand ball steering knuckle);

FIG. 3 is a plan view of one of the yoke arms;

FIG. 4 is a partially broken away plan view of the tie rod; and

FIGS. 5 and 6 are enlarged sectional views of the yoke arm, the same being taken substantially along the lines 5—5 and 6—6, respectively, of FIG. 3.

DESCRIPTION OF THE PREFERRED EMBODIMENT

Referring now in detail to the drawings, the reference numeral 10 denotes a power-driven remotely controlled toy, i.e., model, wheeled vehicle. Inasmuch as the vehicle is conventional except for the servomotor driven steering assembly, most of the vehicle has not been illustrated in the drawings. The vehicle, which is shown as a car, includes a body that has been totally eliminated to better illustrate the steering assembly. The vehicle also includes a chassis constituting a frame 12 that constitutes a baseplate 14 extending the length of the chassis near the bottom of the vehicle and clear of the ground, and a pair of upstanding sideplates 16, 18. The upper edges of the sideplates are provided with inturned flanges 20. The forward portion of the chassis has an open top, for ease of access so that the steering assembly can be installed and serviced without difficulty. If desired, this portion of the chassis may have a removable cover. The central portion of the chassis has a plate 22 secured to the flanges 20 to stiffen the chassis by forming a rigid box frame. The central and rear portions of the chassis contain a liquid fueled motor, a transmission, a differential, brakes, a rear axle, rear wheels, servomotors for performing control functions, a radio receiver and a battery. None of these have any bearing upon the present invention, and, therefore, have not been illustrated.

The steering assembly to which the present invention is directed is denoted by the reference numeral 24. The steering assembly is remotely controlled, power being derived for the same from a battery (not shown) which energizes a linear servomotor 26 of any conventional type. The servomotor conveniently is located in the open-topped forward portion of the chassis. The servomotor is controlled by a radio receiver (not shown) which likewise is powered by the aforesaid battery, the radio receiver being, in turn, controlled through a radio link by a transmitter in the hands of an operator distant from the vehicle 10 but within his field of vision. Such radio control is well known in the art and, therefore, has not been described in detail.

The servomotor includes a motor which, through a kinematic train, linearly drives an output element 28, usually in the form of a plate, that extends through a slot in the wall of the servomotor. The kinematic train just mentioned conventionally includes gears. The servomotor has a certain maximum load (output) capability which will vary from one servomotor to another and which will in part depend upon the amount of force required to actuate the steering assembly for which it is selected. Obviously, a heavy vehicle will require a larger actuating force than a lighter vehicle and, therefore, will require a servomotor having a larger maximum load capability. A typical maximum load capability for servomotors used in conjunction with powered toy-wheeled vehicles such as the vehicle 10 is a maximum output load capability of about 3½ pounds. If the servomotor is stationary and the output element is moved by an external force, (a force other than developed by the servomotor) the servomotor may be damaged, that is to say, some gear teeth may be mutilated or broken. Such type of force is referred to herein as a "driveback" force, this being a force which tends to move the output element of the servomotor mechanically from outside of the servomotor, e.g., from the steering wheels, rather than electrically by the servomotor.

The servomotor output element 28 is connected to a first force limiting decouplable means 30, said means being such that it will become inoperative to transmit force (kinematically ineffective) at a value less than the maximum load capability of the servomotor, in this instance less than 3½ pounds e.g., 3 pounds. Said means thereby will serve to protect the servomotor from a drive-back force that could damage it.

The first force limiting decouplable means 30 constitutes a yoke 32 composed of two arms 34 joined at a base 36. The yoke preferably is composed of two separate pieces each of which constitutes one arm 34 and half of the base 36. The half of the base associated with each arm is referred to herein as a shank 38. The opposed shanks 38 are located on opposite sides of the output element 28 and are suitably connected thereto, for example, as illustrated, each shank 38 is formed with two openings 40, the openings in the two bases being aligned and being aligned with similarly spaced openings (not shown) in the output element 28. Bolts 42 are threaded through the openings 40 in the bases and the corresponding openings in the output element and are secured in place with nuts 44 so that when the nuts are secured on the bolts, the yoke 32 constitutes the opposed arms 34 and the base 36 that is formed of the two shanks 38 with the interposed portion of the output element 28.

Preferably each arm and its associated base is made of one piece and conveniently this one piece is molded from a thermoplastic synthetic resin. The resin is such that the arms, although stiff, may be flexed relative to the base as cantilever beams. Thus, the plastic employed is semistiff or, phrased differently, somewhat elastomeric. A high degree of flexibility is not necessary for reasons which will soon be apparent; indeed the invention will function satisfactorily if the arms are absolutely rigid. Typical plastics which can be satisfactorily employed are styrene-butadiene copolymers with about 10 percent butadiene, and Delrin, an acetal resin manufactured by E. I. duPont de Nemours Co. of Wilmington, Delaware, the same being a polymer composed of recurring linear acetal units consisting of unbranched polyoxymethylene chains of great length averaging more than 1,000 $CH_2O$ units. This latter resin has high-strength, stiffness and a slight degree of flexibility. Delrin has a typical flexural modulus in the neighborhood of 400,000 p.s.i. Another material suitable for the components of the yoke is Nylatron, a material constituting a mixture of nylon and ground glass fibers, the same preferably being used to fabricate the parts of the yoke by injection molding.

Each arm has formed in one piece therewith a rib 46 which runs over a substantial portion of the length of the arm from its tip toward but not reaching the base. The ribs are in the facing surfaces of the arms and, hence, they are opposed to one another. The ribs define between them a gap 48. It can be seen from inspection of FIGS. 1, 2 and 5 that the ribs are arcuate in cross section so that their sides can function as camming surfaces.

Means is included to bias the arms and, therefore, the ribs, toward one another with a selectively variable force. Such means constitutes a screw 50 having a helical compression spring 52 telescopically disposed about its shank. If desired, a washer 54 can be interposed between the head of the screw and the adjacent end of the spring. The screw extends freely through an opening 56 in one of the arms (as shown, the upper arm) and is threadably received in an opening 58 in the other arm that is in registry with the opening 56. The opening 58 is tapped to receive the screw. It will be apparent that the further down the screw is turned and the more the spring is compressed, the greater will be the force that urging together the ribs 46, hence, the greater will be the force that is required to spread the ribs and arms and open the gap 48. It will be observed by reference to FIG. 6 that the ribs 46 terminate short of the shanks 38 to leave a thin section 60 adjacent the shanks thereby to increase the cantilever flexibility of the arms. Optionally, the nuts 44 may not be tightened sufficiently to compress the output element 28 between the shanks 38 but simply employed to prevent the bolts 42 from working loose and to permit a limited angular movement of the arms 34 and associated shanks 38 with respect to the output element 28 of the servomotor. In this event, the nuts may be made fast on the bolts in any suitable manner such, for instance, as staking or the use of locknuts.

Thus, it will be seen that the construction of the yoke is such that the arms 34 are capable of movement toward and away from one another but are urged toward one another by the spring 52 with a force that is a function of the degree of tightening of the screw 50. Hence, the amount of force required to spread the arms against the action of the spring 52 can be predetermined by the operator of the remotely controlled vehicle. The arms 34 and the ribs 46 extend in a direction parallel to the length of the chassis. The bending motion of the arms relative to one another either can be wholly opposed by the spring 52 (if the arms are rigid) or can be additionally opposed by the resistance of the arms to flexing (if the arms are made of resilient material like those above described).

Extending between the arms of the yoke in a direction side to side of the chassis is a tie rod 62. The tie rod is sufficiently long for its ends to project beyond both sideplates 16, 18, the sideplates being provided with oversized openings 64 to permit front-to-back or vertical movement of the tie rod with respect to the chassis. At a point intermediate its ends, the exact position of which will depend upon the location of the servomotor 26, the tie rod is provided with a neck 66, i.e., a portion of reduced diameter. The sidewalls of the neck are sloped so that in cross section (see FIG. 4) the neck roughly matches the cross section of the associated portions of the ribs 46.

In kinematically operative condition of the steering assembly the two ribs engage the neck from diametrically opposite sides of the tie rod so that transverse movement of the yoke under the control of the servomotor will be directly conveyed to the tie rod which will experience a corresponding side-to-side movement depending upon the direction of travel of the output element 28. However, if there is a drive-back force exerted by the tie rod in a direction axially of the tie rod, which drive-back force is sufficient (above the force that will decouple the means 30) to cam the arms of the yoke apart against the force of the spring 52, the gap 48 will open sufficiently to disengage the ribs 46 from the neck and permit the yoke to slide along a portion of the tie rod to one side or another of the neck (depending upon the direction of the drive-back force), which portion is of uniform longitudinal cross section; thereby, further movement of the tie rod will not cause corresponding movement of the yoke in a drive-back direction. The screw 50 is so adjusted that the force required to cam apart the yoke arms is less than the maximum load capability of the servomotor whereby the first force limiting decouplable means 30 will become kinematically ineffective to disconnect the tie rod from the yoke when the drive-back force could damage the servomotor.

The foregoing structure serves to protect the servomotor from a drive-back force which is encountered, for example, when a steering wheel strikes a relatively heavy or immovable object either a glancing or an almost head-on blow. Such a blow normally would be transmitted back to the tie rod to the servomotor, and if the force is sufficiently great could cause appreciable damage to the servomotor. The means 30 prevents this. However, when the decouplable means 30 becomes kinematically ineffective and thereby decouples the drive-back force, coordination between the servomotor and the tie rod is lost.

It is within the scope of the present invention to permit this coordination to be reestablished by the operator of the vehicle who would simply, after opening of the decouplable means, manually push or pull the tie rod back into a position if which the ribs engage the yoke. Nevertheless, in the preferred form of the invention shown a restoring means is employed to automatically reset the coordination between the yoke and tie rod after the drive-back force has ceased or diminished to a value below the force required to decouple the means 30.

Said restoring means includes abutment elements, e.g., in the form of collars 68, anchored, as by setscrews 70, to the tie rods on opposite sides of the yoke 32 and spaced therefrom. Both collars are located in the interior of the frame 12 and, in the position of the servomotor corresponding to a straight-ahead position for the steering wheels, are spaced inwardly from their adjacent sideplates 16, 18. The spacing from the sideplates is sufficient to enable the servomotor to steer the wheels either to the right or to the left as far as is called for by the design of the vehicle.

The restoring means further includes two-helical compression springs 72 one each interposed between a different side of the yoke and the collar located on that side of said yoke. Each spring is under compression between a yoke and a collar and the force exerted by each spring when so compressed, and the ribs are in the neck, is less than the maximum load capability of the servomotor and less than the drive-back force required to open the arms of the yoke 32 and thereby render the first force limiting decouplable means operational to break the kinematic connection between the tie rod and the yoke. Actually the springs balance one another when the ribs are in the neck and exert a net zero force on the yoke. Thereby when the drive-back force is in excess of the force that might damage the servomotor and the yoke opens, the yoke can slide along the tie rod in either direction against one or the other of the restoring spring which will permit such sliding movement. However, as soon as the drive-back force diminishes below the damaging value or returns to zero, the restoring spring in the direction toward which the yoke was moved will force the yoke back along the tie rod until the ribs of the yoke once more engage the neck of the tie rod, thereby reestablishing coordination between the servomotor and the tie rod.

The ends of the tie rod are connected by steering knuckles 74 to steering arms 76.

The steering knuckles are so constructed as to each constitute a second force limiting decouplable means. However, the force required to render this second means ineffective to act as a kinematic force transmitting element is in excess of the maximum load capability of the servomotor, preferably many times in excess in contrast to the force required to render the first force limiting decouplable means kinematically ineffective which is less than the maximum load capability of the servomotor. Typically, with a 3½ pound maximum load capability of the servomotor the force required to decouple the first force limiting means 30 is set by adjustment of the screw 50 to take about 3 pounds, while the steering knuckle constituting the second force limiting decouplable means would preferably become kinematically ineffective in the range of from about 15 to 30 pounds or even as little as 10 pounds or as much as 50 pounds. The actual value employed for the maximum force transmittable by the second force limiting decouplable means before it becomes kinematically ineffective is a function of the design of the vehicle and should be such that the decoupling will take place before damaging components of the steering assembly from the tie rod to the steering wheels. This, in turn, will depend upon the amount of power supplied by the motor which drives the vehicle, the weight of the vehicle and the maximum speed of the vehicle. It also will be determined by the strengths of the various parts of the steering assembly. However, the figures given above at which the second force limiting means will be decoupled is exemplificative of desirable values.

The steering knuckle 74 as illustrated and which constitutes the second force limiting decouplable means (there are two steering knuckles, one on each different end of the tie rod) constitutes a metal ball 78 at the end of and in one piece with a spindle 80 having a threaded extension 82 screwed into a tapped bore 84 at the associated end of the tie rod 62. A locknut 86 prevents the spindle from working loose. The ball, when the steering knuckle 64 is kinematically effective, is seated between the opposite free ends of a yoke 88 the tips of which are formed with registered openings 90 that act as seats for the ball 78 engaging diametrically opposite sides thereof. The arms 92 of the yoke are joined at a base 94, the arms being formed of spring material so that they resiliently press against the opposite sides of the ball.

The ball and the arms form a ball joint steering knuckle 64. The force that can be transmitted through this knuckle is limited to a force at which the arms 92 will flex apart. This is the force at which each steering knuckle will kinematically decouple to disconnect the tie rod from the associated yoke 88. As indicated previously, this force is considerably in excess of the maximum load capability of the servomotor, desirably being between about 15 to 30 pounds and preferably not being less than about 10 pounds nor more than about 50 pounds.

The base of the yoke has extending therefrom a threaded spindle 96 that is screwed into the steering arm 76. The steering arm is in the form of a cylinder with a vertical axis, the same having a vertical bore which is rotatable on a kingpin 98. The opposite ends of the kingpin extend through registered openings 100 formed in arms 102 of a kingpin bracket 104. Optionally, as shown, the upper end of each steering arm is spaced slightly below the inner surface of the upper arm 102 of the kingpin bracket and the exposed portion of the associated kingpin is ensheathed by a compression spring 106 that permits a limited vertical movement of the steering arm in order to absorb vertical shocks to such arm.

The kingpin bracket 104 is secured in any suitable fashion to the associated sideplates 16 or 18 as by screws 108. The openings 100 are so located as to provide a suitable amount of toe-in as is well known, and the screws 108 are so positioned as to provide a suitable amount of camber which likewise is well known in the art.

Each steering arm has a wheel axle 110 extending laterally away therefrom on which a steering wheel 112 is journaled.

The steering knuckles function as a second force limiting decouplable means in the following manner. Assume that a steering wheel on either side of the vehicle strikes a glancing blow on a heavy or immovable object. This will generate a drive-back force which is transmitted through the wheel axle 110, the steering arm 76, the steering knuckle 74, the tie rod 62 and the yoke 32 to the output element 28 of the servomotor. As soon as the drive-back force exceeds the maximum load capability of the servomotor, the first force limiting decouplable means 30 opens to prevent kinematic transmission of the force therethrough. As the drive-back force continues to be transmitted through the steering knuckle 74, the tie rod will continue in its decoupled direction of movement until a collar 68 in such direction of movement strikes the nearest sideplate 16 or 18. The tie rod then can move no further. If the drive-back force exceeds the force transmitting value of the second force limiting decouplable means, i.e., the steering knuckle 74 associated with the wheel at which the drive-back force is generated, the ball 78 at this steering knuckle will "pop out" of the associated yoke 88, the arms of the yoke being flexible and the resiliency thereof being predetermined to permit the ball to become deseated from the arms at a predetermined value. As soon as the second force limiting means becomes kinematically ineffective by decoupling thereof, no further force is transmitted to the tie rod and the force applied to the steering wheel, the steering axle, the kingpin, the kingpin bracket and the yoke will immediately drop to almost zero because this portion of the steering assembly is now free to swing. Obviously, rendering the second force limiting means kinematically ineffective cannot protect the portions of the steering assembly between the steering knuckle and the steering wheel against any impact that is sufficiently severe to force the steering wheel to an extreme position in which it strains one or more of the elements still kinematically associated therewith, i.e., movable therewith. However, a large proportion of possible accidents in which the steering assembly otherwise would be damaged is removed by the foregoing construction.

Attention is directed to the fact that the ribs 48 extend longitudinally of the chassis. This has a particular advantage in connection with a steering servomotor which has an output element that moves sideways in the the i.e., as the steering wheels are turned due to such linear movement and because of the fact that steering knuckles are employed, the tie rod will move in a direction having a component longitudinal of the chassis and this movement is permitted by the longitudinal disposition of the ribs which, during a change in position of the parts of the steering assembly, enable the tie rod to experience such longitudinal movement without binding. This longitudinal movement, furthermore, is permitted by the oversized dimension of the openings 64 in a front-to-back direction. The oversized dimension of the openings in a vertical direction accommodates vertical movement of the steering arms as when a steering wheel rides over a low obstruction in its path and compresses a spring 106.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed new and desired to be secured by Letters Patent:

1. A steering assembly for a model remotely controlled wheeled vehicle having an elongated chassis, said steering assembly including a single axially shiftable tie rod positioned to extend perpendicularly to the longitudinal axis of the vehicle chassis, a servo actuatable element arranged to reciprocate longitudinally on the tie rod and intermediate the ends thereof, a pair of members on opposite sides of and spaced from said element, means to fix said members on said tie rod, and coil springs encircling the tie rod, each spring being under compression between said element and a different one of said members.

2. A steering assembly for a model remotely controlled wheeled vehicle, said steering assembly including a servomotor having a linear output aboard the vehicle, steering wheels and a kinematic train between the servomotor and the steering wheels, said kinematic train including a tie rod and a first force limiting decouplable means, wherein said first force limiting decouplable means includes a yoke having arms on opposite sides of the tie rod, said tie rod and yoke having a cooperating disengageable projection and depression.

3. A steering assembly as set forth in claim 2 wherein the protuberance and depression on the yoke and tie rod have cooperative camming surfaces.

4. A steering assembly as set forth in claim 2 wherein the servomotor has a maximum load capability and said first force limiting decouplable means has a maximum force transmission value less than said maximum load capability of the servomotor.

5. A steering assembly as set forth in claim 4 wherein the first force limiting decouplable means includes means to vary the force at which said force limiting decouplable means becomes kinematically ineffective.

6. A steering assembly as set forth in claim 4 including restoring means to reengage the first force limiting decouplable means after the same becomes kinematically ineffective upon application of a drive-back force and when the drive-back force becomes less than the value to render said first force limiting decouplable means kinematicaily ineffective.

7. A steering assembly as set forth in claim 6 wherein the restoring means constitutes springs under compression between opposite sides of the first force limiting decouplable means.

8. A steering assembly as set forth in claim 7 wherein the steering assembly includes a tie rod and wherein the restoring springs are held under compression between the first force limiting decouplable means and abutment elements secured to the tie rod.

9. A steering assembly as set forth in claim 2 wherein means is included to provide a force biasing the arms of the yoke toward one another.

10. A steering assembly as set forth in claim 9 wherein the force provided by said biasing means is selectively variable.

11. A steering assembly as set forth in claim 10 wherein the biasing means comprises a compression spring urging the arms toward one another and means to vary the compression of the spring.

12. A steering assembly as set forth in claim 11 wherein the means to vary the compression of the spring includes a screw.

13. A steering assembly as set forth in claim 12 wherein the screw extends freely through one arm and is threadedly engaged with the other arm, and wherein the compression spring encircles the shank of the screw and is held under compression between the first-named arm and the head of the screw.

14. A steering assembly as set forth in claim 2 wherein the kinematic train includes a pair of second force limiting decouplable means each kinematically interposed between the first force limiting decouplable means and a different one of the steering wheels.

15. A steering assembly as set forth in claim 14 wherein the maximum force transmission value of the first force limiting decouplable means is less than the maximum force transmission value of each of the second force limiting decouplable means.

16. A steering assembly as set forth in claim 15 wherein the maximum force transmission value of the first force limitable decouplable means is less than the maximum load capability of the servomotor.

17. A steering assembly as set forth in claim 16 wherein the maximum force transmission value of each of the second force limiting decouplable means is in excess of the maximum load capability of the servomotor.

18. A steering assembly as set forth in claim 14 wherein the kinematic train includes an axially shiftable tie rod, the first force limiting decouplable means being interposed between the servomotor and an intermediate portion of the tie rod and each of the second force limiting decouplable means being interposed between a different end of the the rod and an associated steering wheel.

19. A steering assembly as set forth in claim 18 wherein the tie rod is axially shiftable and wherein means is included to limit axial shifting of the tie rod between two extreme positions, the first force limiting decouplable means having a maximum force transmission value less than the maximum force transmission value of each of the second force limiting decouplable means whereby a drive-back force which decouples the first force limiting decouplable means shifts the tie rod to an extreme position whereupon if the drive-back force exceeds the maximum force transmission value of the associated second force limiting decouplable means such second force limiting decouplable means decouples.

20. A steering assembly as set forth in claim 18 wherein the maximum force transmission value of the first force limiting decouplable means is less than the maximum force transmission value of each of the second force limiting decouplable means.

21. A steering assembly as set forth in claim 20 wherein the maximum force transmission value of the first force limiting decouplable means is less than the maximum load capability of the servomotor.

22. A steering assembly as set forth in claim 21 wherein the maximum force transmission value of each of the second force limiting decouplable means is in excess of the maximum load capability of the servomotor.

23. A steering assembly as set forth in claim 14 wherein the kinematic train includes a different steering knuckle associated with each different steering wheel and wherein each different second force limiting decouplable means is incorporated in a different one of the steering knuckles.

24. A steering assembly as set forth in claim 23 wherein each steering knuckle includes as a second force limiting decouplable means a ball and a pair of opposed ball seats and wherein means is included to resiliently urge the seats against opposite sides of the ball.

* * * * *